(12) United States Patent
Nair et al.

(10) Patent No.: US 12,430,673 B2
(45) Date of Patent: Sep. 30, 2025

(54) SYSTEMS AND METHODS FOR REQUEST VALIDATION

(71) Applicant: VERIZON PATENT AND LICENSING INC., Basking Ridge, NJ (US)

(72) Inventors: Dhanraj J. Nair, Flower Mound, TX (US); Harold Rex Slay, Jr., Valrico, FL (US); Srinivasarao Valluru, Telangana (IN); Sarathchandra Konidena, Telangana (IN); Naseer Mohammed, Telangana (IN)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 202 days.

(21) Appl. No.: 17/750,701

(22) Filed: May 23, 2022

(65) Prior Publication Data
US 2023/0377004 A1    Nov. 23, 2023

(51) Int. Cl.
G06Q 30/00     (2023.01)
G06N 20/00     (2019.01)
G06Q 30/0282   (2023.01)

(52) U.S. Cl.
CPC ......... *G06Q 30/0282* (2013.01); *G06N 20/00* (2019.01)

(58) Field of Classification Search
None
See application file for complete search history.

(56) References Cited

U.S. PATENT DOCUMENTS

| | | | |
|---|---|---|---|
| 2003/0126319 A1* | 7/2003 | Adusumilli | G06F 13/28 710/22 |
| 2017/0127417 A1* | 5/2017 | Andreoli-Fang | H04W 76/15 |
| 2017/0372436 A1* | 12/2017 | Dalal | G06N 20/00 |
| 2018/0088939 A1* | 3/2018 | Strachan | G06N 7/01 |
| 2020/0178026 A1* | 6/2020 | Liang | G06N 20/00 |
| 2020/0213805 A1* | 7/2020 | Liang | G06N 20/00 |
| 2021/0200444 A1* | 7/2021 | Park | G06F 3/0683 |
| 2021/0209508 A1* | 7/2021 | Ionescu | G06N 20/00 |
| 2022/0172037 A1* | 6/2022 | Kang | G06N 3/044 |
| 2023/0153643 A1* | 5/2023 | Ramanasankaran | G06N 5/022 706/47 |

OTHER PUBLICATIONS

All Features Great and Small: Distinguishing the Effects of Specific Magnetically Active Features on Radial-Velocity Exoplanet Detections, Author: Milbourne, Timothy William, Publication info: Harvard University, ProQuest Dissertations Publishing, 2021. (Year: 2021).*

(Continued)

*Primary Examiner* — Matthew T Sittner (57) ABSTRACT

According to disclosed embodiments, a request validation framework is provided for managing requests. An aspect of the present disclosure is a method of managing request, the method comprising receiving request data, applying a feature extraction model the request data to extract at least one feature, applying a predictive model to the at least one feature, determining an output of the predictive model, the output indicating an action that may be performed in relation to the request; and performing the action with respect to the request.

20 Claims, 7 Drawing Sheets

(56) References Cited

OTHER PUBLICATIONS

Towards Multiclass Damage Detection and Localization Using Limited Vibration Measurements, Author: Sony, Sandeep, Publication info: The University of Western Ontario (Canada), ProQuest Dissertations Publishing, 2021. (Year: 2021).*

Machine Learning Methods for Mining Mobility Data, Author: Ghourchian, Negar, Publication info: McGill University (Canada), ProQuest Dissertations Publishing, 2016. (Year: 2016).*

* cited by examiner

SYSTEMS AND METHODS FOR REQUEST VALIDATION

BACKGROUND

Typical methods of analyzing user requests containing user information provide human reviewers with probabilities indicating whether the request or the user information is illegitimate. The ultimate decision to allow or deny said requests falls on the human reviewers. Given the need for human review, said methods are time and resource intensive while delivering inconsistent results.

BRIEF DESCRIPTION OF THE DRAWINGS

The foregoing and other objects, features, and advantages of the disclosure will be apparent from the following description of embodiments as illustrated in the accompanying drawings, in which reference characters refer to the same parts throughout the various views. The drawings are not necessarily to scale, emphasis instead being placed upon illustrating principles of the disclosure.

DETAILED DESCRIPTION

The rapid growth in digital interactions in commercial and non-commercial settings have led to a significant increase in fraudulent or deceitful representations by malicious users in user requests containing user information. Routinely, malicious actor submit requests or send messages to an organization purporting to be a legitimate user in order to gain a financial benefit or to gain information about the legitimate user. For example, digital thieves may submit fraudulent tax returns on behalf of unsuspecting victims in order to appropriate any funds owed by the Internal Revenue Service. Likewise, a legitimate user may submit a fraudulent order or request to an organization (e.g., a vendor or retailer) misrepresenting the user's information to gain an advantage or benefit for themselves.

Sophisticated new schemes by malicious actors have rendered traditional rule based approaches incapable of differentiating legitimate from fraudulent requests. Some techniques in the art have attempted to leverage artificial intelligence (AI) and machine learning (ML) to improve detection capability and reduce user friction. However, these models are typically limited to classifying the request as High, Medium or Low risk, with any request identified as Medium or above requiring manual intervention. This approach inherently limits the scalability and applicability of these techniques due to the volume of requests and the cost associated with human intervention. Attempts to implement complete AI/ML solutions have failed to deliver accurate runtime results with sensible computational and cost requirements.

In an embodiment, a method implements a request validation framework to decide whether to allow or deny a given request. In some embodiments, the message or request may be a purchase order. In some embodiments, the message or request may be a tax report and/or return. In some embodiments, the request may be a request to provide a product or a service. In some embodiments, the method may include receiving a request or request data corresponding to the request from a plurality of channels. In some embodiments, a request may be received from an online website or portal. In some embodiments, a request may be received from a mobile application. In some embodiments, a request may be received through an in-person interaction. In some embodiments, a request may be received over the phone through a live agent or an Interactive Voice Response (IVR) system.

In some embodiments, prior to being analyzed by the request validation framework, requests from different channels may be received and stored by a centralized intake system. In some embodiments, the intake system can then perform an initial check to determine whether the request may be allowed, denied, or identified for further analysis. In some embodiments, requests identified for further analysis may be propagated through the request validation framework to determine whether to allow or deny the request.

In some embodiments, the request validation framework may include a pre-processing model to normalize request data corresponding to requests received from the different channels. In some embodiments, the normalized request data may be propagated through a feature extraction model to identify features from the normalized request data and generate a feature vector. In some embodiments, the feature vector may be propagated through a predictive model to generate a prediction on whether the request should be an allowed request or a denied request. In some embodiments, the request validation framework may allow or deny a given request based on the output from the predictive model.

Figure 1:
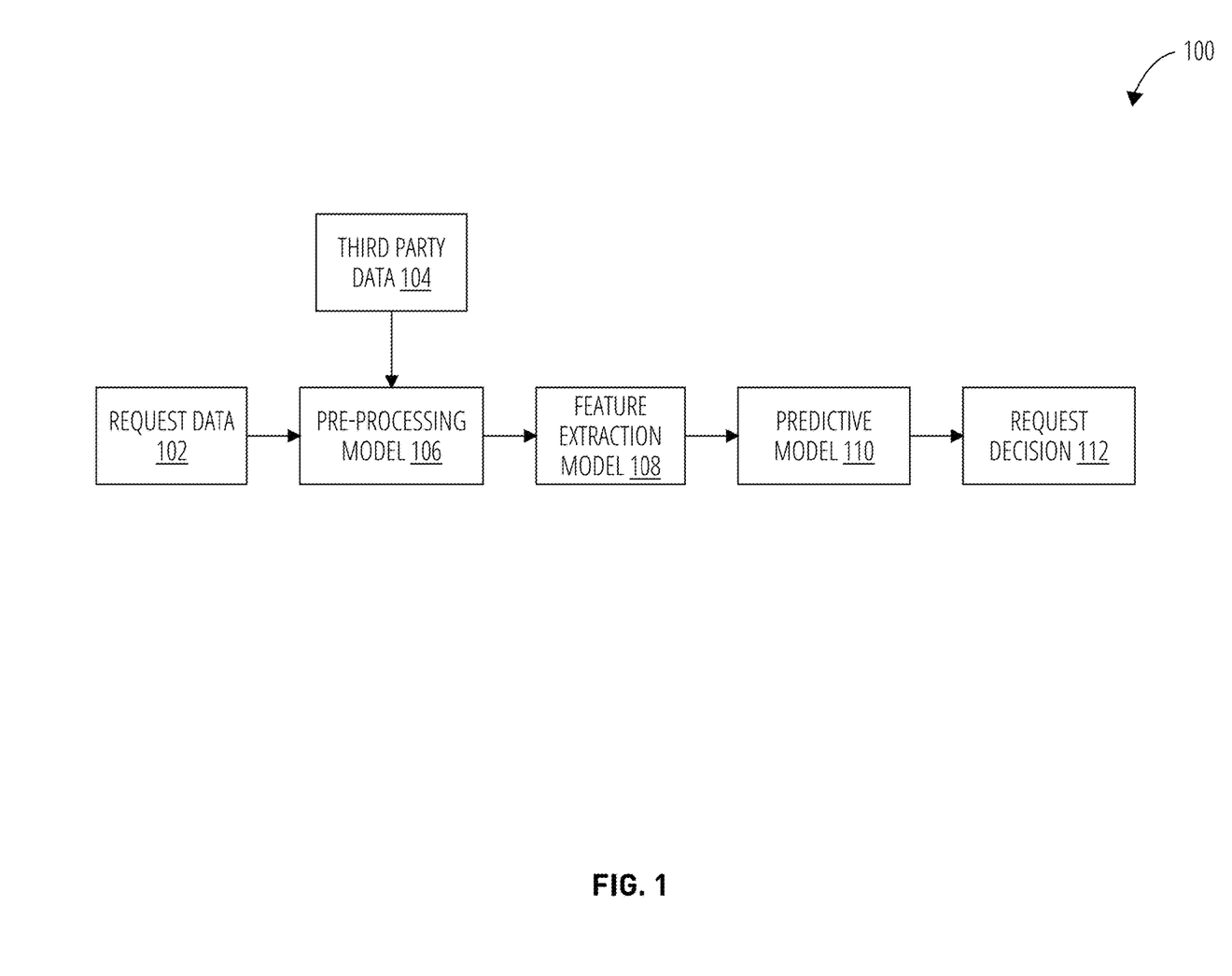
FIG. 1 is a flow diagram of a framework for managing requests in accordance with some embodiments of the present disclosure.

Turning now to FIG. 1, FIG. 1 is a flow diagram of a request validation framework 100 for managing requests in accordance with some embodiments of the present disclosure. In some embodiments, framework 100 may include one or more AI/ML models. In some embodiments, one or more ML models of the framework 100 may predict one or more actions to be performed in relation to a request. In some embodiments, one or more ML models of the framework 100 may predict one or more classifications corresponding to a request. In some embodiments, a device or devices (e.g., device 700) implementing framework 100 may perform the action with respect to the request. According to some embodiments, framework 100 may be implemented in whole or in part by prediction engine 602.

In some embodiments, framework 100 includes request data 102 corresponding to a given request. In some embodiments, a given request may be related to a specific user or a plurality of users. In some embodiments, request data 102 may include data from a plurality of requests corresponding to a plurality of users. In some embodiments, request data 102 may include personally identifiable information (PII) of a user or users. In some embodiments, request data 102 may include electronic communications of the user. In some embodiments, request data 102 may be received by a server or other computing device (e.g., device 700).

In some embodiments, request data 102 may be received from a plurality of channels or sources (e.g., over network 612). In some embodiments, request data 102 may be stored in database 614. In some embodiments, request data 102 may be a combination of data or information received through multiple channels. In some embodiments, request data 102 may be received through an online website or portal, a mobile application, an in-person interaction, electronic communications (e.g., email or instant messaging (IM)), phone calls (e.g., a live agent or an Interactive Voice Response (IVR) system), or a combination thereof. In some embodiments, request data may include data generated by a human reviewer analyzing the request. For example, in some embodiments, a human reviewer may provide a report regarding the request or regarding request data received from other channels. In some embodiments, the human reviewer may provide data indicating a preliminary decision (e.g., allow or deny) regarding the request. In some embodiments, the human reviewer may determine that information contained in the request is inconsistent with the rest of the request and may provide request data indicating as such. In some embodiments, a human reviewer may be a channel. In some embodiments, a human reviewer may generate third party data 104.

In some embodiments, request data 102 may include additional information or data from third parties related to the request or the user. For example, in some embodiments, request data 102 may include digital documents or images corresponding to the user or the request. In some embodiments, third party data may be validated by a third-party application programming interface (API). In some embodiments, third party data 104 is provided separate from the request data 102. In some embodiments, third party data 104 may be retrieved by data module 604 from database 614 or some other database (not shown) connected to network 612.

In some embodiments, framework 100 may include one or more data pre-processing models 106. In some embodiments, pre-processing model 106 may be applied to the request data 102 to generate normalized request data. In some embodiments, data module 604 of prediction engine 602 may implement pre-processing model 106 to normalize or otherwise transform request data 102. In some embodiments, pre-processing model 106 converts raw data included in request data 102 and converts it to normalized request data. In some embodiments, pre-processing model 106 may normalize request data 102 received from different channels and/or relating to different users.

In some embodiments, data module 604 may apply pre-processing model 106 to the third party data 104 separate from request data 102. In some embodiments, data module 604 may combine request data 102 and third party data 104 and apply pre-processing model 106 to the combined data.

In some embodiments, pre-processing model 106 may be an outlier detection model. In some embodiments, an outlier detection model may use interquartile range (IQR) limits (e.g., Q1−4*IQR, Q3+4*IQR) to detect the outliers where Q1 and Q3 represent the $1^{st}$ and $3^{rd}$ quartiles of the data.

In some embodiments, pre-processing model 106 may be a redundancy removal model. In some embodiments, redundancy removal model may remove redundant variables from request data 102 through correlation and association analysis to reduce the dimensions of the data to avoid complexity and multicollinearity. In some embodiments, pre-processing model 106 may be a missing value imputation model. In some embodiments, a missing value imputation model may impute missing values of continuous variables through median to avoid influence of extreme observations. In some embodiments, missing values of discrete variables may be imputed through a negative constant to differentiate the magnitude while estimating coefficients.

In some embodiments, pre-processing model 106 may be a range adjustment model. In some embodiments, a range adjustment model. In some embodiments, a range adjustment model may curtail data values between $1^{st}$ and $99^{th}$ percentile and any values beyond these limits may be adjusted to $1^{st}$ percentile on the lower side and $99^{th}$ percentile on the higher side. In some embodiments, pre-processing model 106 may implement other data transformation techniques such as standard scalar or robust scalar to bring numerical variables into the same scale (e.g., feature transformation). In some embodiments, pre-processing model 106 may implement a feature conversion model to convert numerical variables to categorical variables through target feature-based binning. In some embodiments, pre-processing model 106 may be a combination of one or more of the foregoing.

According to some embodiments, a feature extraction model 108 may be applied to the normalized request data or the request data 102 to extract relevant or salient features. In some embodiments, data module 604 may implement feature extraction model 108. In some embodiments, which features associated with a request or request data 102 are relevant or salient may be determined during a training process (e.g., as described with respect to FIG. 2 and FIG. 3).

In some embodiments, the extracted features may be propagated through a predictive model 110. In some embodiments, predictive model 110 may be implemented on prediction module 608 of prediction engine 602. In some embodiments, predictive model 110 may include one or more neural networks, recurrent neural networks, convolutional neural networks, generative adversarial networks, and the like. In some embodiments, predictive model 110 may include one or more boosting models (e.g., CatBoost, XGBoost and LightGBM). In some embodiments, predictive model 110 may be a random forest model, a support vector machine (SVM) model, a logistic regression model, or a combination thereof.

In some embodiments, data from one channel may have a separate flow from data from another channel. For example, in an embodiment, a first request data 102 corresponding to a given request may be received from a mobile application while a second request data 102 related to the same request may be received from a phone call. Then, in some embodiments, the first request data 102 and the second request data 102 may be normalized separately and propagated through different feature extraction models 108 and different predictive models 110. In some embodiments, the output of all predictive models 110 may be combined prior to making a determination on whether the request should be allowed or denied. In some embodiments, different sub-segments of request data 102 may be propagated through different feature extraction models and/or different predictive models 110. In some embodiments, different sub-segments of request data 102 may be propagated through different feature extraction models 108. In some of those embodiments, the extracted features may be combined prior to being propagated through a predictive model 110. In some embodiments, different sub-segments of request data 102 may be propagated through a feature extraction model 108 corresponding to each sub-segment, and the output of each feature extraction model 108 may be independently propagated through a predictive model 110 corresponding to the sub-segment. In some embodiments, the outputs of each predictive model 110 corresponding to each sub-segments may be stacked or combined and, from the stacked or combined outputs, prediction engine 602 may select an action to be performed with respect to the request. In some embodiments, the several feature extraction models 108 corresponding to the different sub-segments may be the same or different feature extraction model 108 as a feature extraction model 108 corresponding to another sub-segment. In some embodiments, the several predictive models 110 corresponding to the different sub-segments may be the same or different predictive model 110 as a predictive model 110 corresponding to another sub-segment.

In some embodiments, predictive model 110 yields a probability for each classification corresponding to the request. In some embodiments, predictive model 110 yields a score for each classification corresponding to the request. In some embodiments, a classification corresponds to an action that may be performed with respect to a request or requests. In some embodiments, a classification may be allow, deny, delete, reply, fraudulent, and non-fraudulent. In some embodiments, where framework 100 includes more than one predictive model 110, the outputs of each predictive model 110 corresponding to each class may be averaged to determine a final score. In some embodiments, where framework 100 includes more than one predictive model 110, the outputs of predictive models 110 may be stacked together. In some embodiments, where framework 100 includes more than one predictive model 110, one or more outputs of predictive models 110 may be derived from a voting classifier by giving more weight to the highly confident classifier (e.g., a predictive model 110).

In some embodiments, prediction module 608 may use the probabilities or scores assigned to each category to yield a request decision 112. In some embodiments, the request decision 112 indicates an action that may be performed with respect to the request associated with request data 102. In some embodiments, decision module 610 may use the predicted action to automatically perform the action. In some embodiments, an action may be allowing the request. In some embodiments, the action may be denying the request. In some embodiments, request decision 112 may correspond to an output from predictive model 110 having a predetermined probability threshold. In some embodiments, the probability threshold is a percentage (e.g., greater than 50%). In some embodiments, the probability threshold is determined during a training operation of framework 100 as illustrated in FIG. 2.

Figure 2:
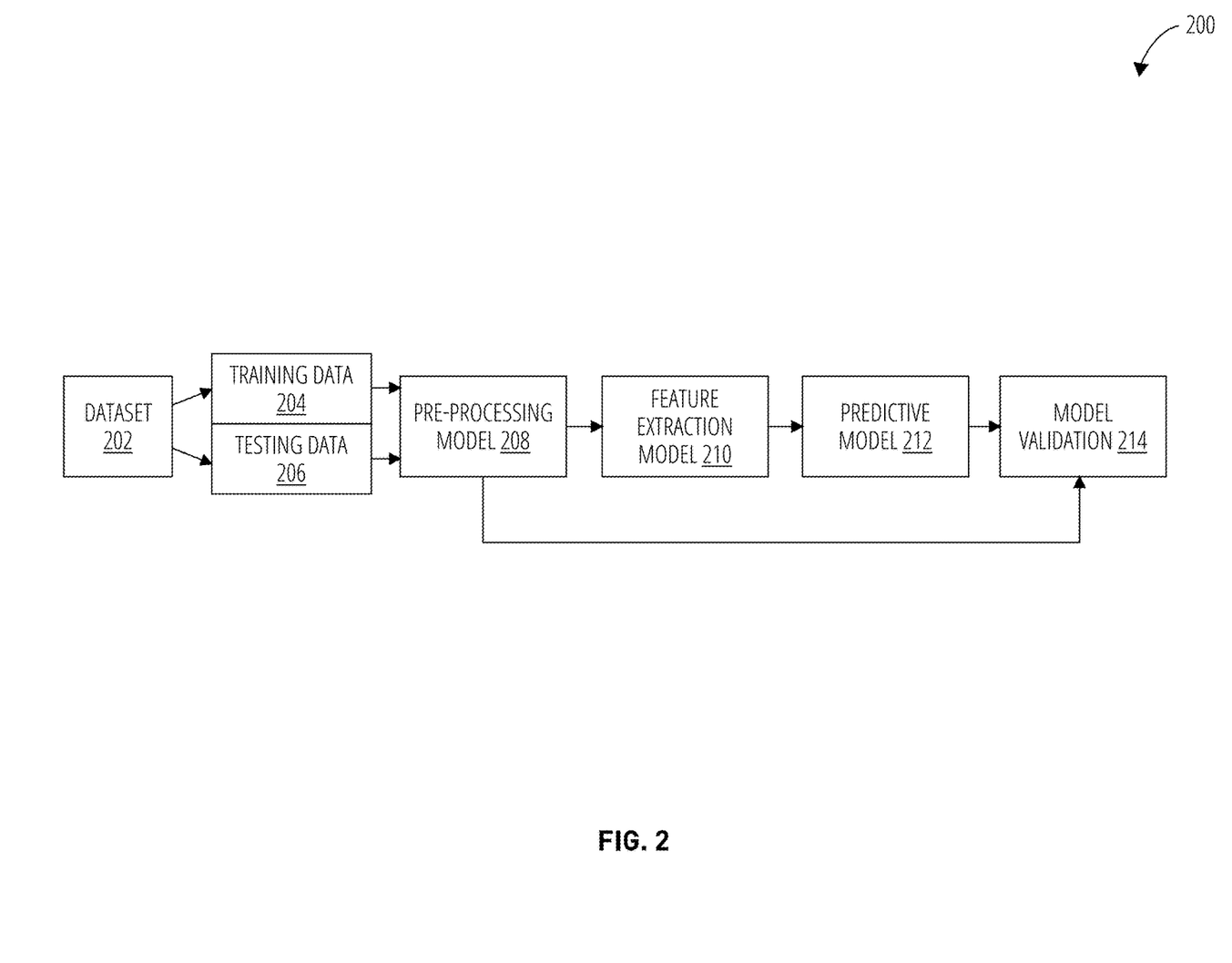
FIG. 2 is a flow diagram of a framework for training models used is managing requests in accordance with some embodiments of the present disclosure.

Turning now to FIG. 2, FIG. 2 is a flow diagram illustrating a training framework 200 of one or more models of a request validation framework (e.g., framework 100) according to some embodiments of the present disclosure.

According to some embodiments, framework 200 may be implemented in whole or in part by prediction engine 602. During a training phase, data module 604 of prediction engine 602 may retrieve a dataset 202 from a database 614. In some embodiments, the dataset 202 may include a plurality of requests and an associated action (e.g., a class) performed with respect to the request (e.g., allow or deny). In some embodiments, data from dataset 202 may be segregated into two groups training data 204—used in training predictive model 212—and testing data 206—used in validating predictive model 212 after it has been trained. In some embodiments, the data from dataset 202 may be segregated into training data 204 and testing data 206 using stratified random sampling.

In some embodiments, one or more data pre-processing models 208 may be applied to training data 204 and testing data 206. In some embodiments, the one or more pre-processing models 208 may be applied to the data from dataset 202 prior to segregating the data so that all data is normalized with respect to remaining data. In some embodiments, pre-processing model 208 may be applied independently to the training data 204 and testing data 206 to normalize the data within each group.

In some embodiments, pre-processing model 208 may include any of the models and techniques discussed in relation to pre-processing model 106 of FIG. 1. In some embodiments, pre-processing model 208 may be an outlier detection model, a missing value imputation model, a redundancy removal model, a feature transformation model, a range adjustment model, a feature conversion model, or a combination thereof.

In some embodiments, framework 200 identifies which features of the request data may be salient or relevant in predicting an action related to a request. In some embodiments, which features are relevant or salient may be determined by a type of request, a type of user, a channel of related to the request, or data contained within the request. A non-limiting embodiment of a framework for determining salient features is further discussed in relation to FIG. 3.

In some embodiments, training module 606 may apply one or more feature extraction models 210 to the normalized data from the pre-processing model 208. In some embodiments, normalized training data 204 may be culled to remove or mitigate non-salient features. In some embodiments, normalized training data 204 includes data and metadata associated with the salient features.

In some embodiments, framework 200 utilizes training module 606 to train one or more predictive models 212 using the training data 204 and associated selected features. In some embodiments, predictive model 212 may include one or more simple neural networks, recurrent neural networks, convolutional neural networks, and generative adversarial networks. In some embodiments, predictive model 212 may include one or more boosting models (e.g., CatBoost, XGBoost and LightGBM). In some embodiments, predictive model 110 may be a random forest model, a support vector machine (SVM) model, a logistic regression model, or a combination thereof.

In some embodiments, predictive model 212, pre-processing model 208, and/or feature extraction model 210 may have a plurality of parameters. In some embodiments, training predictive model 212 may include adjusting one or more of the plurality of parameters of the predictive model 212. In some embodiments, training predictive model 212 may include adjusting one or more parameters of the predictive model 212, pre-processing model 208, and/or feature extraction model 210. In some embodiments, training module 606 trains predictive model 212 by adjusting the one or more of the parameters of the predictive model 212 to optimize a plurality of output metrics (e.g., precision, recall, and F1-score). In some embodiments, training module 606 trains predictive model 212, pre-processing model 208, and/or feature extraction model 210, by adjusting one or more of the parameters to optimize a plurality of output metrics (e.g., precision, recall, and F1-score).

According to some embodiments, once the predictive model 212 has been trained, training module 606 may perform model validation 214 using testing data 206 to further tune the predictive model 212. In some embodiments, tuning the predictive model 212 may also comprise tuning pre-processing model 208 and/or feature extraction model 210 In some embodiments, after predictive model 212 has been used during operation, predictive model 212, pre-processing model 208, and feature extraction model 210 may be further trained with additional data. In some embodiments, the additional data may be data corresponding to requests where the model prediction was not correct. In some embodiments, predictive model 212 may be retrained periodically to adapt the predictive model 212 to new data, users, patterns, or types of channels. In some embodiments, retraining predictive model 212 includes updating the parameters of the predictive model 212.

Figure 3:
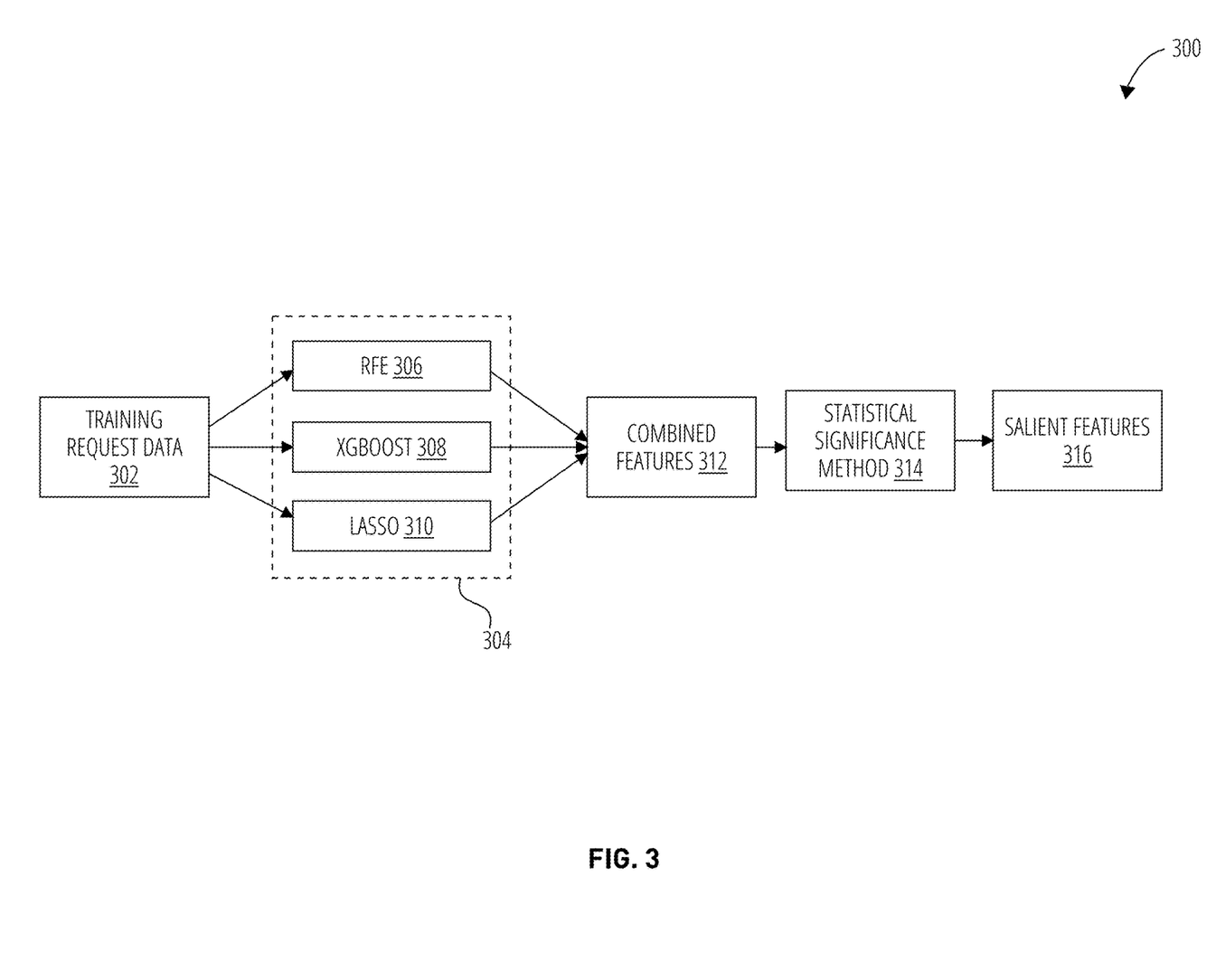
FIG. 3 is a flow diagram of a framework for selecting salient features of requests in accordance with some embodiments of the present disclosure.

Turning now to FIG. 3, FIG. 3 is a flow diagram illustrating a feature selection framework 300 according to some embodiments of the present disclosure. In some embodiments, framework 300 may indicate salient or relevant features from training request data 302 corresponding to one or more requests. As will be noted, in some embodiments, a given request may be of a plurality of request types and/or emanate from a plurality of channels. In some embodiments, framework 300 allows for the automated identification of salient or relevant features of request data. In some embodiments, the identified features may inform the parameters and characteristics of a feature extraction model (e.g., feature extraction model 108 or feature extraction model 210).

According to some embodiments, framework 300 may be implemented in whole or in part by prediction engine 602. During a training phase, data module 604 of prediction engine 602 may retrieve training request data 302 from a database 614. In some embodiments, the training request data 302 may include a plurality of requests and an associated action (e.g., a class) performed with respect to the request (e.g., allow or deny). In some embodiments, training request data 302 may be data that has been processed by a pre-processing model (e.g., pre-processing model 106 or pre-processing model 208) as discussed herein.

In some embodiments, training module 606 may propagate the training request data 302 through one or more feature selection methods 304. In some embodiments, a feature selection method may be a Recursive Feature Elimination (RFE) method 306, XGBoost 308, and/or a LASSO method 310 as understood by those skilled in the art. In some embodiments, RFE 306 may be an RFE method using Random Forest. In some embodiments, LASSO 310 may be referred to as an L1 regularization method. In some embodiments, training request data 302 may be propagated through RFE 306, XGBoost 308, and LASSO 310, individually.

In some embodiments, each of the feature selection methods 304 may independently identify a set of salient features. In some embodiments, the salient features from each of the feature selection methods 304, may be combined into combined features 312. In some embodiments, the combined features 312 may be the union from the sets of salient features identified by each of the feature selection methods 304 (e.g., the salient features common to all the sets of salient features).

In some embodiments, training module 606 may apply a statistical significance method 314 (sometimes referred to as a Wald test) to the combined features 312 to identify the statistically significant salient features from combined features 312. In some embodiments, the statistically significant features identified by statistical significance method 314 are outputted as salient features 316. As noted above, in some embodiments, salient features 316 may be used by a feature extraction model or some other model used in validating requests.

Figure 4:
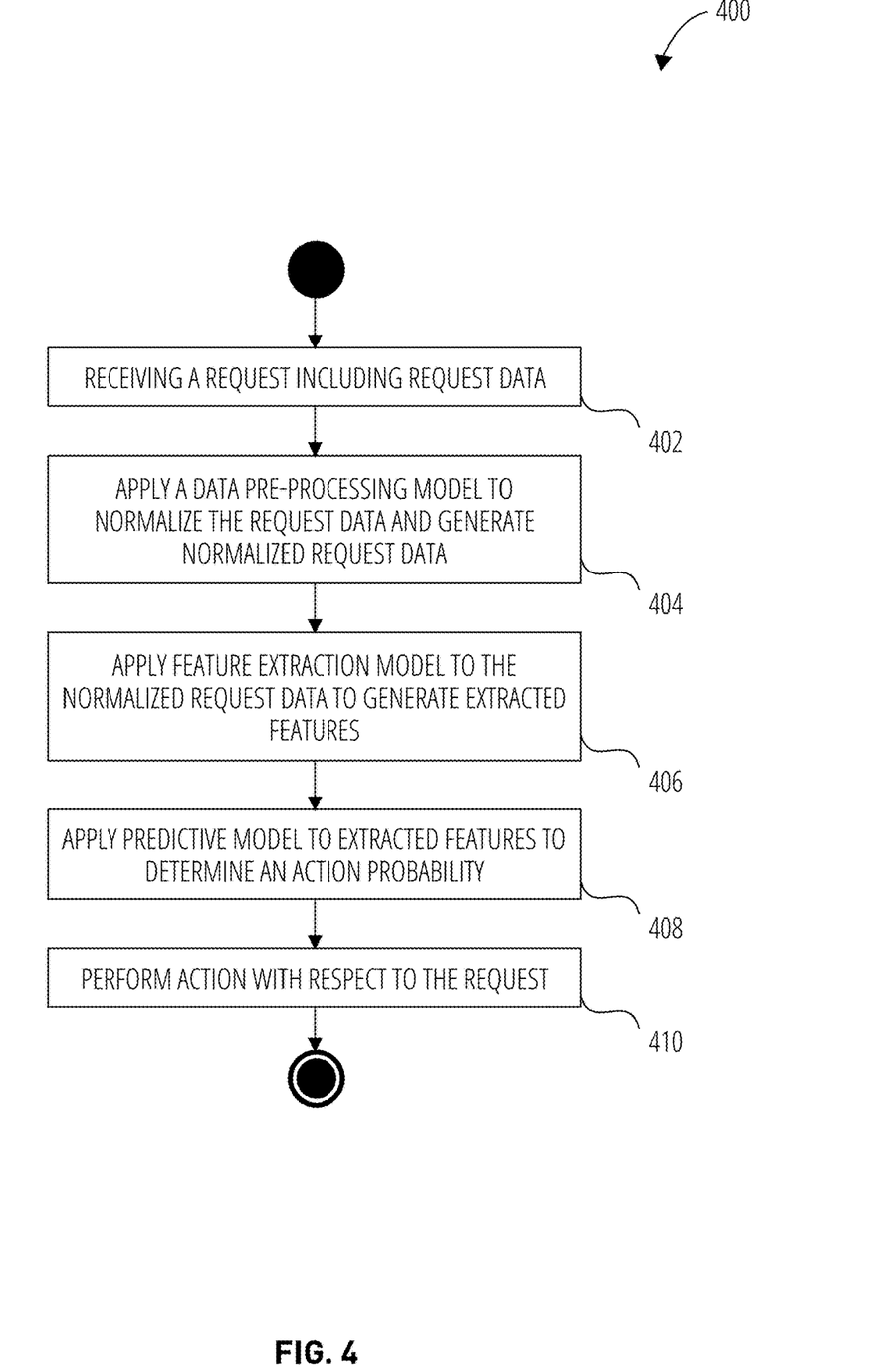
FIG. 4 illustrates a process for validating a request according to some embodiments of the present disclosure.

Turning to FIG. 4, FIG. 4 illustrates a non-limiting embodiment Process 400 for validating a request according to some embodiments of the present disclosure. The Steps of Process 400 correspond to the data flow within the request validation framework discussed above in relation to FIG. 1. According to some embodiments, Steps 402-406 of Process 400 may be performed by data module 604 of prediction engine 602; Steps 408 may be performed by prediction module 608; and Step 410 may be performed by decision module 610.

Process 400 begins with Step 402 where prediction engine 602 may receive a request corresponding to a user and including user information. In some embodiments, the request may contain request data. In some embodiments, prediction engine 602 may identify and retrieve the request or request data from a database (e.g., database 614). While the discussion herein will be based on a single request, it should not be construed as limiting, as the identified request can be a plurality of requests, and one of skill in the art would understand that the scope of the instant disclosure would remain unchanged. According to some embodiments, the request can be any type of known or to be known request, communications, message, or item submitted by a user which may be used by the user to communicate with another user or an organization.

In Step 404, the request data may be normalized to prepare the data for feature extraction and/or action prediction. In some embodiments, in Step 404, a pre-processing model is applied to the request data to normalize the data and generate normalized request data. In some embodiments, a pre-processing model may be an outlier detection model, a missing value imputation model, a redundancy removal model, a feature transformation model, a range adjustment model, a feature conversion model, or a combination thereof.

In Step 406, the normalized request data is analyzed in order to identify and/or extract features (or characteristics or attributes, used interchangeably) that relate to the request, the request data, and/or the user. In some embodiments, data module 604 may apply a feature extraction model to the normalized request data to extract relevant features. In some embodiments, the type of features extracted in Step 406 may be selected using a feature selection framework as discussed herein.

According to some embodiments, the analysis and feature extraction performed in Step 406 can be performed by data module 604 executing any type of known or to be known feature extraction model, computational analysis technique, algorithm or artificial intelligence or machine learning mechanism, such as, but not limited to, computer vision, neural networks, data mining, feature extraction, and the like.

Process 400 then proceeds to Step 408, where prediction module 608 of the prediction engine 602 applies a predictive model (e.g., predictive model 110) to the extracted features to determine a score or probability for one or more actions (e.g., allow, deny) that may be performed with respect to the request. In some embodiments, the score or probability may be an output of prediction module 608. In some embodiments, in Step 408, the prediction module 608 determines a score or probability for one or more classification that may be assigned to the request (e.g., fraudulent, non-fraudulent). In some embodiments, in Step 408, the scores corresponding to the actions may be converted to probabilities using a sigmoid function.

In Step 410, decision module 610 of prediction engine 602 may select one or more of the actions. In some embodiments, the one or more actions includes all actions that meet or exceed a predetermined threshold. In some embodiments, the predetermined threshold is arbitrarily selected (e.g., 50%, 75%). In some embodiments, the predetermined threshold is the average of the probabilities of some or all of the actions. In some embodiments, the predetermined threshold is the mean of the probabilities of some or all of the actions. In some embodiments, the predetermined threshold is the median of the probabilities of some or all of the actions. In some embodiments, the predetermined threshold is determined by removing actions with probabilities that are outliers and calculating one of an average, a mean, and a median of the remaining actions.

In some embodiments, after Step 410, decision module 610 of prediction engine 602 may automatically perform one or more of the actions selected. In some embodiments, prediction engine 602 may transmit a message or otherwise communicate instructions to other devices to perform one or more of the actions selected.

Figure 5:
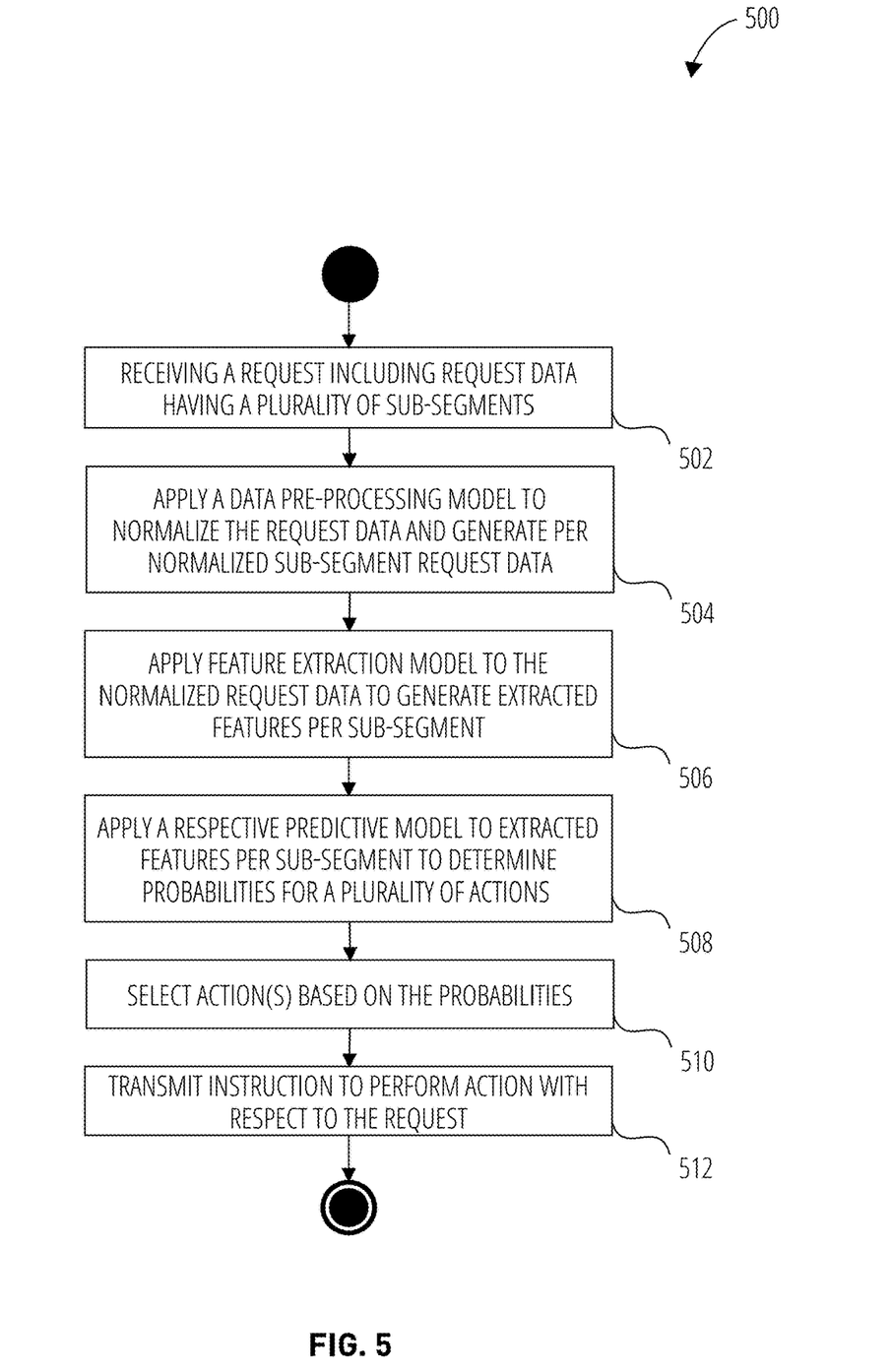
FIG. 5 illustrates a process for validating a request according to some embodiments of the present disclosure.

Turning to FIG. 5, FIG. 5 illustrates a non-limiting embodiment Process 500 for validating a request according to some embodiments of the present disclosure. The Steps of Process 500 correspond to the data flow within the request validation framework discussed above in relation to FIG. 1. According to some embodiments, Steps 502-506 of Process 500 may be performed by data module 604 of prediction engine 602; Steps 508 may be performed by prediction module 608; and Step 512 may be performed by decision module 610.

Process 500 begins with Step 502 where prediction engine 602 may receive a request including request data corresponding to a plurality of channels. In some embodiments, request data is received from each of the plurality of channels. In some embodiments, request data may have a plurality of sub-segments corresponding to data received from some or all of the channels of the plurality of channels. In some embodiments, prediction engine 602 may identify and retrieve the request, the request data, or one or more sub-segments of the request data from a database (e.g., database 614). In some embodiments, prediction engine 602 may receive request data or sub-segments of the request data from a third party (e.g., third party data 104).

While the discussion herein will be based on a single request, it should not be construed as limiting, as the identified request can be a plurality of requests, and one of skill in the art would understand that the scope of the instant disclosure would remain unchanged. According to some embodiments, the request can be any type of known or to be known request, communications, message, or item submitted by a user which may be used by the user to communicate with another user or an organization.

In Step 504, data module 604 may apply a data pre-processing model to the request data to normalize the data (e.g., prepare the data for feature extraction and/or action prediction). In some embodiments, in Step 504, one or more pre-processing model may be applied to the request data to normalize the data and generate normalized request data. In some embodiments, a pre-processing model may be applied independently to each sub-segment of the request data. In some embodiments, different pre-processing models may be applied independently to respective sub-segments of the request data. In some embodiments, a plurality of different pre-processing models may be applied independently to respective sub-segments of the request data. In some embodiments, a pre-processing model may be an outlier detection model, a missing value imputation model, a redundancy removal model, a feature transformation model, a range adjustment model, a feature conversion model, or a combination thereof. In some embodiments, applying one or more pre-processing models to a sub-segment of request data generates normalized sub-segment request data.

In Step 506, the normalized sub-segment data is analyzed in order to identify and/or extract features (or characteristics or attributes, used interchangeably). In some embodiments, data module 604 may apply a feature extraction model to the normalized sub-segment request data to extract relevant features. In some embodiments, the type of features extracted in Step 506 may be selected using a feature selection framework as discussed herein. In some embodiments, one or more feature extraction models is applied to a respective normalized sub-segment request data to extract one or more features of the normalized sub-segment request data.

According to some embodiments, the analysis and feature extraction performed in Step 506 can be performed by data module 604 executing any type of known or to be known feature extraction model, computational analysis technique, algorithm or artificial intelligence or machine learning mechanism, such as, but not limited to, computer vision, neural networks, data mining, feature extraction, and the like.

Process 500 then proceeds to Step 508, where prediction module 608 of the prediction engine 602 may apply one or more predictive models (e.g., predictive model 110) to the extracted features to determine a score or probability for one or more actions (e.g., allow, deny) that may be performed with respect to the request. In some embodiments, a respective predictive model may be applied to the extracted features of each of the normalized sub-segment request data. In some embodiments, one or more respective predictive models may be applied to the extracted features of each of the normalized sub-segment request data.

In some embodiments, the score or probability may be an output of prediction module 608. In some embodiments, in Step 508, a prediction module 608 determines a score or probability for one or more classifications that may be assigned to the request (e.g., fraudulent, non-fraudulent). In some embodiments, in Step 408, the scores correspond to the actions may be converted to probabilities using a sigmoid function. In some embodiments, each respective predictive model corresponding to the subsegments may generate a probability for a plurality of actions. In some embodiments, each respective predictive model generates probabilities for the same classes or actions. In some embodiments, the outputs of the respective predictive models are combined. For example, in an embodiment, the outputs of each of the respective predictive models may be averaged for each class or action thereby generating a probability for each class or action.

In Step 510, decision module 610 of prediction engine 602 may select one or more of the actions. In some embodiments, the one or more actions includes all actions that meet or exceed a predetermined threshold. In some embodiments, the predetermined threshold is arbitrarily selected (e.g., 50%, 75%). In some embodiments, the predetermined threshold is the average of the probabilities of some or all of the actions. In some embodiments, the predetermined threshold is the mean of the probabilities of some or all of the actions. In some embodiments, the predetermined threshold is the median of the probabilities of some or all of the actions. In some embodiments, the predetermined threshold is determined by removing actions with probabilities that are outliers and calculating one of an average, a mean, and a median of the remaining actions. In some embodiments, decision module 610 may select the action with the highest probability.

In some embodiments, in Step 512, decision module 610 of prediction engine 602 may automatically perform one or more of the actions selected. In some embodiments, prediction engine 602 may transmit a message or otherwise communicate instructions to other devices to perform one or more of the actions selected. For example, in some embodiments, prediction engine 602 may be implemented in a first server, and after selecting an action or actions, decision module 610 may transmit a message or a signal to a second server containing instructions to perform the action or actions.

Figure 6:
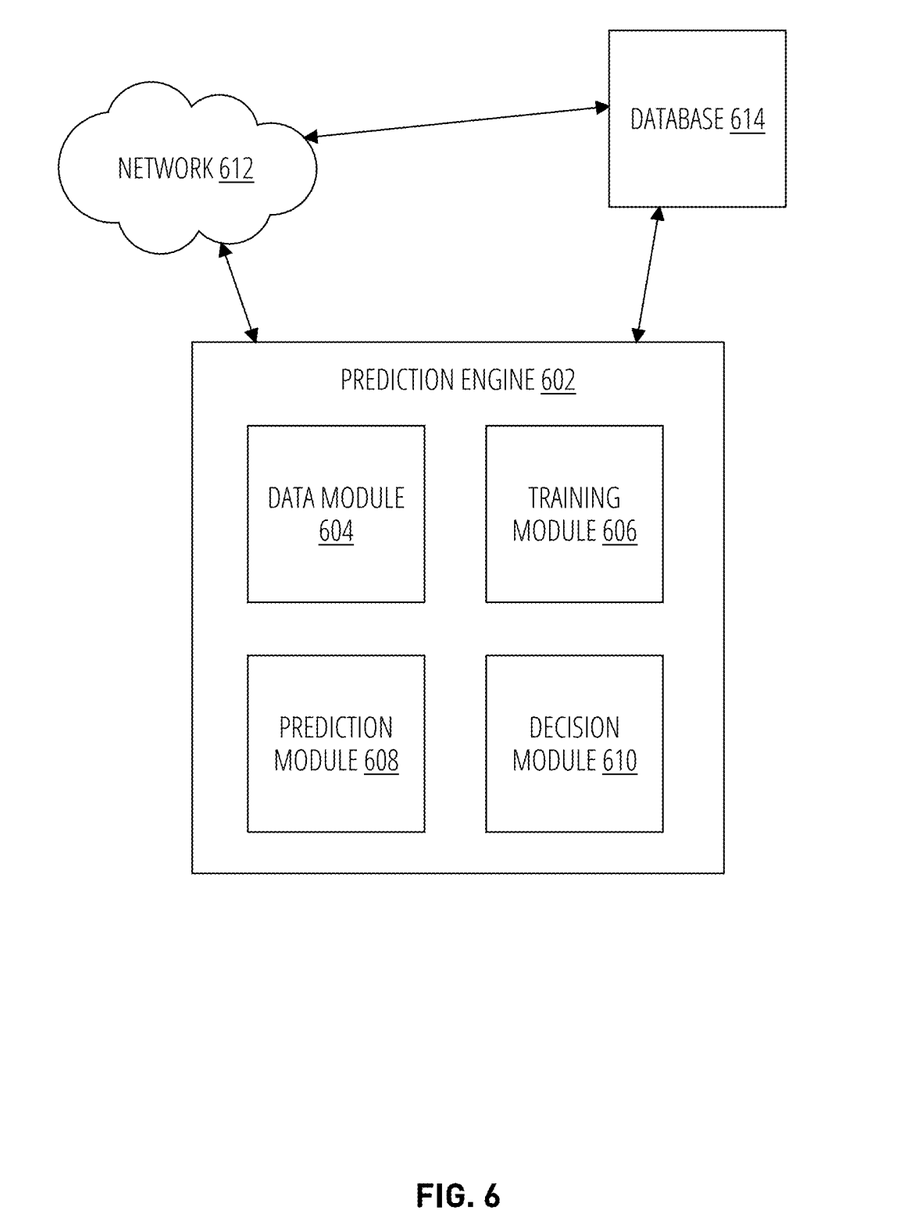
FIG. 6 is a block diagram illustrating components of a prediction engine in accordance with embodiments of the present disclosure.

FIG. 6 is a block diagram illustrating the components for performing the systems and methods discussed herein. FIG. 6 includes prediction engine 602, network 612, and database 614. The prediction engine 602 can be a special purpose machine or processor and could be hosted by a cloud server (e.g., cloud web services server(s)), messaging server, application server, content server, social networking server, web server, search server, content provider, third party server, user's computing device, and the like, or any combination thereof.

According to some embodiments, prediction engine 602 can be a stand-alone application that executes on a user device. In some embodiments, prediction engine 602 can function as an application installed on the user's device, and in some embodiments, such application can be a web-based application accessed by the user device over a network. In some embodiments, portions of the prediction engine 602 function as an application installed on the user's device and some other portions can be cloud-based or web-based applications accessed by the user's device over a network, where the several portions of the prediction engine 602 exchange information over the network. In some embodiments, the prediction engine 602 can be installed as an augmenting script, program or application (e.g., a plug-in or extension) to another application or portable data structure.

Figure 7:
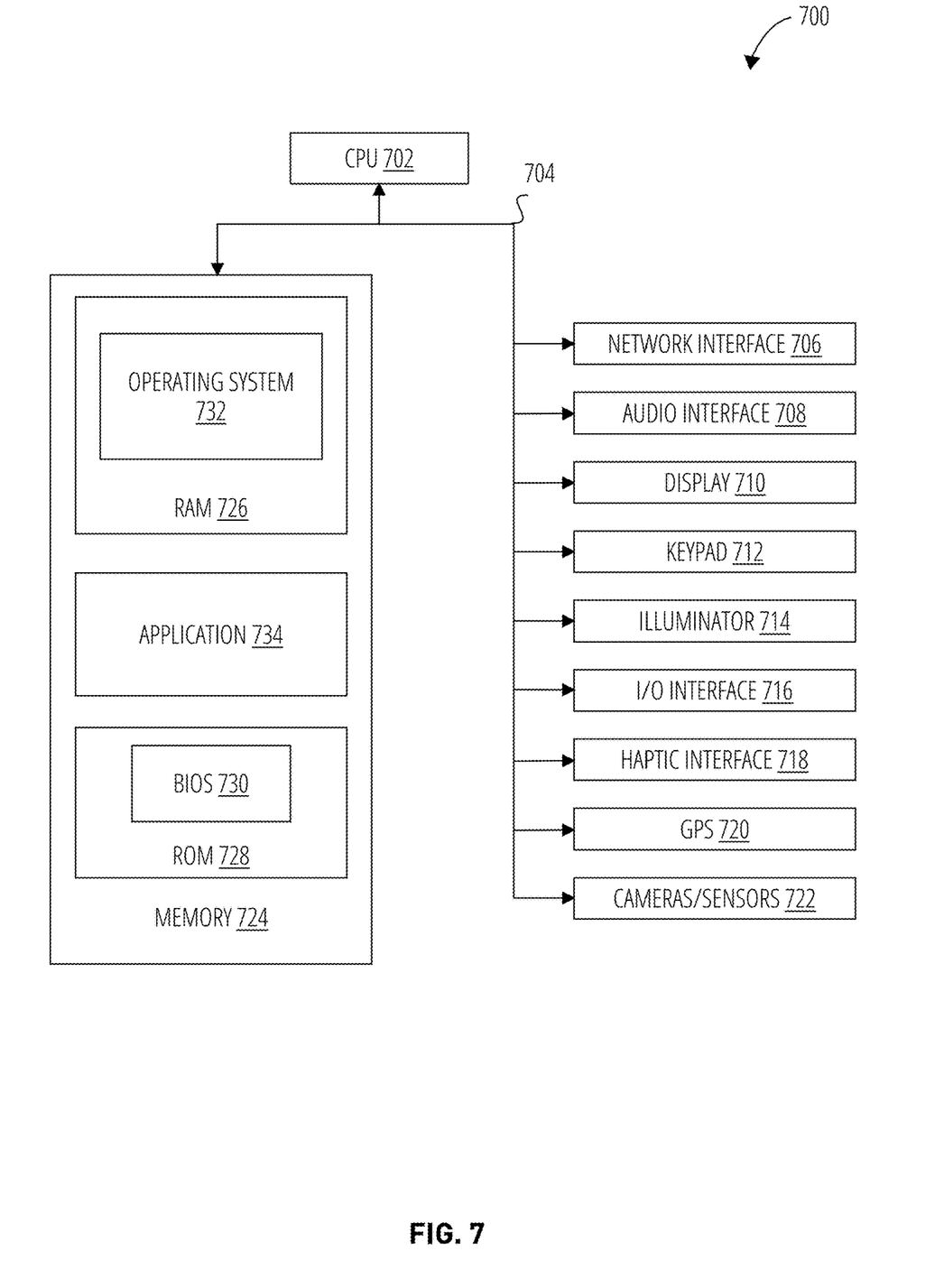
FIG. 7 is a block diagram illustrating an example of a client or server device used in various embodiments of the present disclosure.

The database 614 can be any type of database or memory, and can be associated with a content server or an application server on a network or a user device (e.g., device 700 from FIG. 7). In some embodiments, database 614 may include a dataset of data and metadata associated with local and/or network information related to users, services, applications, requests, content and the like. In some embodiments, database 614 includes a dataset of data and metadata corresponding to requests in a request validation service. In a non-limiting embodiment, database 614 includes a corpus of requests containing a large number of requests. In some embodiments, such information can be stored and indexed in the database 614 independently and/or as a linked or associated dataset. For example, in some embodiments, request data for a plurality of requests may be associated with a user.

According to some embodiments, database 614 can store data for users, e.g., user data. According to some embodiments, the stored user data can include, but is not limited to, information associated with a user's profile, user interests, user behavioral information, user patterns, user attributes, user preferences or settings, user messages, user demographic information, user location information, user biographic information, and the like, or some combination thereof. In some embodiments, user data may be received or retrieved from a third-party. In some embodiments, the user data can also include user device information, including, but not limited to, device identifying information, device capability information, voice/data carrier information, Internet Protocol (IP) address, applications installed or capable of being installed or executed on such device, and/or any, or some combination thereof. It should be understood that the data (and metadata) in the database 614 can be any type of information related to a user, content, a device, an application, a service provider, a content provider, whether known or to be known, without departing from the scope of the present disclosure.

According to some embodiments, database 614 may store data and metadata associated with users, messages, images, videos, text, products, items and services from an assortment of media, applications and/or service providers and/or platforms, and the like. Accordingly, any other type of known or to be known attribute or feature associated with a request, data item, media item, login, logout, website, application, communication (e.g., a message) and/or its transmission over a network, a user and/or content included therein, or some combination thereof, can be saved as part of the data/metadata in database 614.

According to some embodiments, network 612 can be any type of network such as, but not limited to, a wireless network, a local area network (LAN), wide area network (WAN), the Internet, or a combination thereof. In some embodiments, network 612 may facilitate connectivity of the prediction engine 602, and the database 614. Indeed, as illustrated in FIG. 6, the prediction engine 602 and database 614 can be directly connected by any known or to be known method of connecting and/or enabling communication between such devices and resources.

The principal processor, server, or combination of devices that comprise hardware programmed in accordance with the special purpose functions herein is referred to for convenience as prediction engine 602, and includes data module 604, training module 606, prediction module 608, and decision module 610. It should be understood that the engine(s) and modules discussed herein are non-exhaustive, as additional or fewer engines and/or modules (or sub-modules) may be applicable to the embodiments of the systems and methods discussed. The operations, configurations and functionalities of each module, and their role within embodiments of the present disclosure will be discussed below.

FIG. 7 is a schematic diagram illustrating an example embodiment of a device 700 (e.g., a client device or server device) that may be used in the various embodiments of the present disclosure. Device 700 may include more or fewer components than those shown in FIG. 7. However, the components shown are sufficient to disclose an illustrative embodiment for implementing the present disclosure.

As shown in the figure, device 700 includes a processing unit (CPU) 702 in communication with a mass memory 724 via a bus 704. Device 700 also includes one or more network interface 706, an audio interface 708, a display 710, a keypad 712, an illuminator 714, an input/output (I/O) interface 716, a haptic interface 718, an optional global positioning systems (GPS) receiver 720, and one or more cameras or other optical, thermal or electromagnetic sensor 722.

Device 700 may optionally communicate with a base station (not shown), or directly with another computing device. Network interface 706 is sometimes known as a transceiver, transceiving device, or network interface card (NIC).

Mass memory 724 illustrates a non-limiting example of computer storage media for storage of information such as computer readable instructions, data structures, program modules or other data. Mass memory 724 can include random access memory (RAM) 726, read-only memory (ROM) 728, or any other type of memory known or to be known. Mass memory 724 can store a basic input/output system (BIOS) 730 for controlling low-level operation of device 700. The mass memory 724 can also store an operating system 732 for controlling the operation of device 700.

Applications 734 may include computer-executable instructions which, when executed by device 700, transmit, receive, and/or otherwise process messages, requests, audio, video, images, and enable telecommunication with a server and/or another user of another client device.

Device 700 may be referred to as a computing device or a client device, interchangeably. A computing device may be capable of sending or receiving signals, such as via a wired or wireless network, or may be capable of processing or storing signals, such as in memory as physical memory states. A client device may, include a portable and non-portable devices including without limitation, cellphones, tablets, wearables, and integrated or distributed devices combining various features, such as features of the forgoing devices, or the like. In some embodiments, device 700 may operate as a server that can provide processing, database, and communication facilities. In some embodiments, a server may be embodied in a single, physical processor with associated communications and data storage facilities, or it may be a networked or clustered complex of processors and associated network and storage devices (e.g., cloud servers).

As will be understood, embodiments described herein may have applicability beyond request validation. In some embodiments, a validation framework (e.g., framework 100) may be used collect data from a plurality of channels and make a determination as to an action that may be performed with respect to the data or a classification representing an aspect of the data.

For example, according to some embodiments, during a credit risk evaluation process for prospective customers, a credit organization may return an indeterminate status which requires manual intervention. Typically, this may involve manual evaluation of supporting documents and third party data to approve or reject a credit request. This process may takes several hours to clear causing customer friction and lost sales. In some embodiments, a request validation framework may be leveraged to review the documentation and generate a decision regarding the request.

In an example, according to some embodiments, a debt collection organization may leverage a request validation framework to determine whether to restore customers who make timely payments as well as accelerate debt recovery. In another example, according to some embodiments, a request validation framework may be used by sales agents to create a guided flow powered by the request validation framework which captures historical patterns as well as signals from current interactions to provide an offer. In yet another example, according to some embodiments, a request validation framework may assist engineering professionals in making corrective decisions with the help of historical data. In still another example, according to some embodiments, a request validation framework may help support engineers in recycling applications by leveraging historical data.

Throughout the specification and claims, terms may have nuanced meanings suggested or implied in context beyond an explicitly stated meaning. Likewise, the phrase "in some embodiments" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

As utilized herein, the terms "comprises" and "comprising" are intended to be construed as being inclusive, not exclusive. As utilized herein, the terms "exemplary", "example", and "illustrative", are intended to mean "serving as an example, instance, or illustration" and should not be construed as indicating, or not indicating, a preferred or advantageous configuration relative to other configurations. As utilized herein, the terms "about", "generally", and "approximately" are intended to cover variations that may existing in the upper and lower limits of the ranges of subjective or objective values, such as variations in properties, parameters, sizes, and dimensions. In one non-limiting example, the terms "about", "generally", and "approximately" mean at, or plus 10 percent or less, or minus 10 percent or less. In one non-limiting example, the terms "about", "generally", and "approximately" mean sufficiently close to be deemed by one of skill in the art in the relevant field to be included. As utilized herein, the term "substantially" refers to the complete or nearly complete extend or degree of an action, characteristic, property, state, structure, item, or result, as would be appreciated by one of skill in the art. For example, an object that is "substantially" circular would mean that the object is either completely a circle to mathematically determinable limits, or nearly a circle as would be recognized or understood by one of skill in the art. The exact allowable degree of deviation from absolute completeness may in some instances depend on the specific context. However, in general, the nearness of completion will be so as to have the same overall result as if absolute and total completion were achieved or obtained. The use of "substantially" is equally applicable when utilized in a negative connotation to refer to the complete or near complete lack of an action, characteristic, property, state, structure, item, or result, as would be appreciated by one of skill in the art.

For the purposes of this disclosure a non-transitory computer readable medium (or computer-readable storage medium/media) stores computer data, which data can include computer program code (or computer-executable instructions) that is executable by a computer, in machine readable form. By way of example, and not limitation, a computer readable medium may comprise computer readable storage media, for tangible or fixed storage of data, or communication media for transient interpretation of code-containing signals. Computer readable storage media, as used herein, refers to physical or tangible storage (as opposed to signals) and includes without limitation volatile and non-volatile, removable and non-removable media implemented in any method or technology for the tangible storage of information such as computer-readable instructions, data structures, program modules or other data. Computer readable storage media includes, but is not limited to, RAM, ROM, EPROM, EEPROM, flash memory or other solid state memory technology, optical storage, cloud storage, magnetic storage devices, or any other physical or material medium which can be used to tangibly store the desired information or data or instructions and which can be accessed by a computer or processor.

The present disclosure has been described with reference to block diagrams and operational illustrations of methods and devices. It is understood that each block of the block diagrams or operational illustrations, and combinations of blocks in the block diagrams or operational illustrations, can be implemented by means of analog or digital hardware and computer program instructions. These computer program instructions can be provided to a processor of a general-purpose computer to alter its function as detailed herein, a special purpose computer, ASIC, or other programmable data processing apparatus, such that the instructions, which execute via the processor of the computer or other programmable data processing apparatus, implement the functions/acts specified in the block diagrams or operational block or blocks. In some alternate implementations, the functions/acts noted in the blocks can occur out of the order noted in the operational illustrations. For example, two blocks shown in succession can in fact be executed substantially concurrently or the blocks can sometimes be executed in the reverse order, depending upon the functionality/acts involved.

In the preceding specification, various example embodiments have been described with reference to the accompanying drawings. However, it will be evident that various modifications and changes may be made thereto, and additional embodiments may be implemented without departing from the broader scope of the disclosed embodiments as set forth in the claims that follow. Embodiments described herein may be combined or separated without parting from the disclosure. The specification and drawings are accordingly to be regarded in an illustrative rather than restrictive sense. For example, subject matter may be embodied as methods, devices, components, or systems. Accordingly, embodiments may, for example, take the form of hardware, software, firmware or any combination thereof (other than software per se).

What is claimed is:

1. A method comprising:
receiving, by a device, request data from a plurality of channels corresponding to a request, the request data having a plurality of sub-segments corresponding to the plurality of channels;
extracting, by the device executing a feature extraction model to each of the sub-segments, at least one feature from each of the sub-segments;
executing, by the device, respective predictive models to the at least one feature corresponding to each of the sub-segments;
determining, by the device, a plurality of outputs of each of the respective predictive models via the application of the respective predictive models to the at least one feature corresponding to each of the sub-segments;
determining, by the device, an action to be performed with respect to the request based on a combination of the plurality of outputs; and
causing, by the device, over a network, another device to perform the action, the caused performance of the action comprising instructions being sent over the network, by the device, to the other device, that cause, without user involvement, the other device to automatically perform the action based on the instructions received from the device.

2. The method of claim 1, further comprising normalizing the request data across the sub-segments using a pre-processing model prior to executing the feature extraction model.

3. The method of claim 1, wherein at least one of the respective predictive models is different from another of the respective predictive models.

4. The method of claim 1, wherein each of the plurality of outputs of each of the respective predictive models is a probability corresponding to each of a plurality of actions that may be performed with respect to the request, and wherein combining the outputs comprises calculating an average of the probabilities for each of the plurality of actions.

5. The method of claim 1, further comprising sending an instruction to perform the action to a device.

6. The method of claim 1, further comprising training a predictive model of the respective predictive models, and wherein training the predictive model comprises:
retrieving a training dataset from a database;
segregating the dataset into training data and testing data using stratified random sampling;
determining at least one output metric related to the predictive model by propagating the training data through the predictive model; and
updating the predictive model by adjusting a parameter of the predictive model based on the at least one output metric.

7. The method of claim 6, wherein the training dataset is updated periodically and wherein the predictive model is retrained using the updated training dataset.

8. The method of claim 1, wherein the at least one feature is a salient feature selected from a plurality of features, and wherein selecting the salient feature comprises:
retrieving a training dataset from a database;
executing a plurality of feature selection models to the training dataset to generate a plurality of sets of features, each set of features corresponding to a different feature selection model of the plurality of feature selection models;
determining a set of combined features including the features common to each of the plurality of sets of features; and
determining a set of salient features based on a result of applying a statistical significance method to the set of combined features.

9. A non-transitory computer-readable storage medium, the computer-readable storage medium including instructions that when executed by a device, cause the device to:
receive, by the device, request data from a plurality of channels corresponding to a request, the request data having a plurality of sub-segments corresponding to the plurality of channels;
extract, by the device executing a feature extraction model to each of the sub-segments, at least one feature from each of the sub-segments;
execute, by the device, respective predictive models to the at least one feature corresponding to each of the sub-segments;
determine, by the device, a plurality of outputs of each of the respective predictive models via the application of the respective predictive models to the at least one feature corresponding to each of the sub-segments;

determine, by the device, an action to be performed with respect to the request based on a combination of the plurality of outputs; and causing, by the device, over a network, another device to perform the action, the caused performance of the action comprising instructions being sent over the network, by the device, to the other device, that cause, without user involvement, the other device to automatically perform the action based on the instructions received from the device.

10. The non-transitory computer-readable storage medium of claim 9, wherein the instructions further configure the device to normalize the request data across the sub-segments using a pre-processing model prior to executing the feature extraction model.

11. The non-transitory computer-readable storage medium of claim 9, wherein at least one of the respective predictive models is different from another of the respective predictive models.

12. The non-transitory computer-readable storage medium of claim 9, wherein each of the plurality of outputs of each of the respective predictive models is a probability corresponding to each of a plurality of actions that may be performed with respect to the request, and wherein combining the outputs comprises calculating an average of the probabilities for each of the plurality of actions.

13. The non-transitory computer-readable storage medium of claim 9, wherein the instructions further configure the device to send an instruction to perform the action to another device.

14. The non-transitory computer-readable storage medium of claim 9, wherein the instructions further configure the device to train a predictive model of the respective predictive models, and wherein training the predictive model comprises:
retrieving a training dataset from a database;
segregating the dataset into training data and testing data using stratified random sampling;
determining at least one output metric related to the predictive model by propagating the training data through the predictive model; and
updating the predictive model by adjusting a parameter of the predictive model based on the at least one output metric.

15. The non-transitory computer-readable storage medium of claim 14, wherein the training dataset is updated periodically and wherein the predictive model is retrained using the updated training dataset.

16. The non-transitory computer-readable storage medium of claim 9, wherein the at least one feature is a salient feature selected from a plurality of features, and wherein selecting the salient feature comprises:
retrieving a training dataset from a database;
executing a plurality of feature selection models to the training dataset to generate a plurality of sets of features, each set of features corresponding to a different feature selection model of the plurality of feature selection models;
determining a set of combined features including the features common to each of the plurality of sets of features; and
determining a set of salient features based on a result of applying a statistical significance method to the set of combined features.

17. A device comprising:
a processor configured to:
receive request data from a plurality of channels corresponding to a request, the request data having a plurality of sub-segments corresponding to the plurality of channels;
extract, by executing a feature extraction model to each of the sub-segments, at least one feature from each of the sub-segments;
execute respective predictive models to the at least one feature corresponding to each of the sub-segments;
determine a plurality of outputs of each of the respective predictive models via application of the respective predictive models to the at least one feature corresponding to each of the sub-segments;
determine an action to be performed with respect to the request based on a combination of the plurality of outputs; and
cause, over a network, another device to perform the action, the caused performance of the action comprising instructions being sent over the network, by the device, to the other device, that cause, without user involvement, the other device to automatically perform the action based on the instructions received from the device.

18. The device of claim 17, wherein each of the plurality of outputs of each of the respective predictive models is a probability corresponding to each of a plurality of actions that may be performed with respect to the request, and wherein combining the outputs comprises calculate an average of the probabilities for each of the plurality of actions.

19. The device of claim 17, wherein the processor is further configured to train a predictive model of the respective predictive models, and wherein training the predictive model comprises:
retrieving a training dataset from a database;
segregating the dataset into training data and testing data using stratified random sampling;
determining at least one output metric related to the predictive model by propagating the training data through the predictive model; and
updating the predictive model by adjusting a parameter of the predictive model based on the at least one output metric.

20. The device of claim 17, wherein the at least one feature is a salient feature selected from a plurality of features, and wherein selecting the salient feature comprises:
retrieving a training dataset from a database;
executing a plurality of feature selection models to the training dataset to generate a plurality of sets of features, each set of features corresponding to a different feature selection model of the plurality of feature selection models;
determining a set of combined features including the features common to each of the plurality of sets of features; and
determining a set of salient features based on a result of applying a statistical significance method to the set of combined features.

\* \* \* \* \*